United States Patent
Piper et al.

(10) Patent No.: US 8,096,731 B2
(45) Date of Patent: Jan. 17, 2012

(54) MODULAR HOT STAB WITH IMPROVED CONNECTION FLANGE

(75) Inventors: Britton F. Piper, Edmond, OK (US); Thomas Clay, Edmond, OK (US); Barrett Hartman, Moore, OK (US)

(73) Assignee: Piper Valve Systems, Ltd. Co.

( * ) Notice: Subject to any disclaimer, the term of this patent is extended or adjusted under 35 U.S.C. 154(b) by 0 days.

(21) Appl. No.: 12/699,403

(22) Filed: Feb. 3, 2010

(65) Prior Publication Data
US 2010/0209198 A1    Aug. 19, 2010

Related U.S. Application Data

(60) Provisional application No. 61/152,638, filed on Feb. 13, 2009.

(51) Int. Cl.
*F16L 1/12* (2006.01)
(52) U.S. Cl. ........................ 405/170; 405/169
(58) Field of Classification Search .............. 405/158, 405/169, 170, 184.5; 166/338, 341, 344
See application file for complete search history.

(56) References Cited

U.S. PATENT DOCUMENTS

| | | | | |
|---|---|---|---|---|
| 6,004,072 A | * | 12/1999 | Cunningham | 405/170 |
| 7,225,877 B2 | * | 6/2007 | Yater | 166/344 |
| 2007/0184683 A1 | * | 8/2007 | Barber et al. | 439/74 |

\* cited by examiner

*Primary Examiner* — David Bagnell
*Assistant Examiner* — Benjamin Fiorello
(74) *Attorney, Agent, or Firm* — Crowe & Dunlevy

(57) ABSTRACT

A connection assembly for connecting sub-sea lines and devices includes a stab receptacle assembly and a stab assembly. The stab receptacle assembly includes a receptacle body and an outlet assembly, which in turn, includes an adapter nipple configured for attachment to the first sub-sea line. A swivel flange secures the adapter nipple to the first side of the receptacle body. The use of the adapter nipple and swivel flange eliminates a difficult weld between the adapter nipple and the receptacle body. The connection assembly further includes a stab assembly that has a base, a line end connected to the base and a stab body connected to the base. The stab body is configured for insertion into the stab receptacle. The line end is configured for connection to the second sub-sea line.

16 Claims, 5 Drawing Sheets

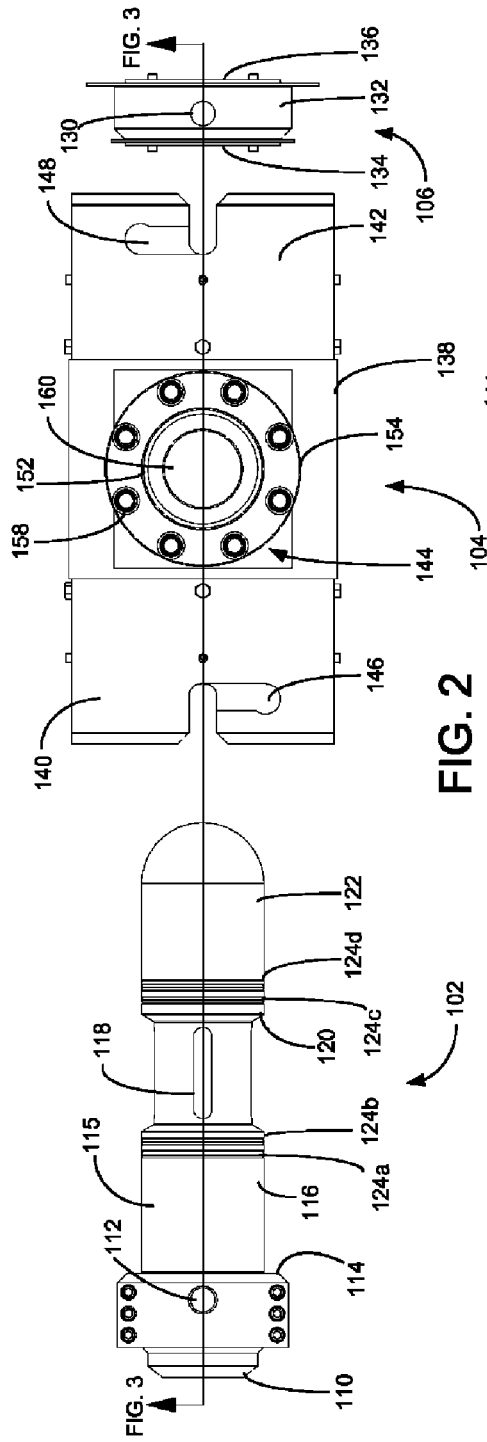
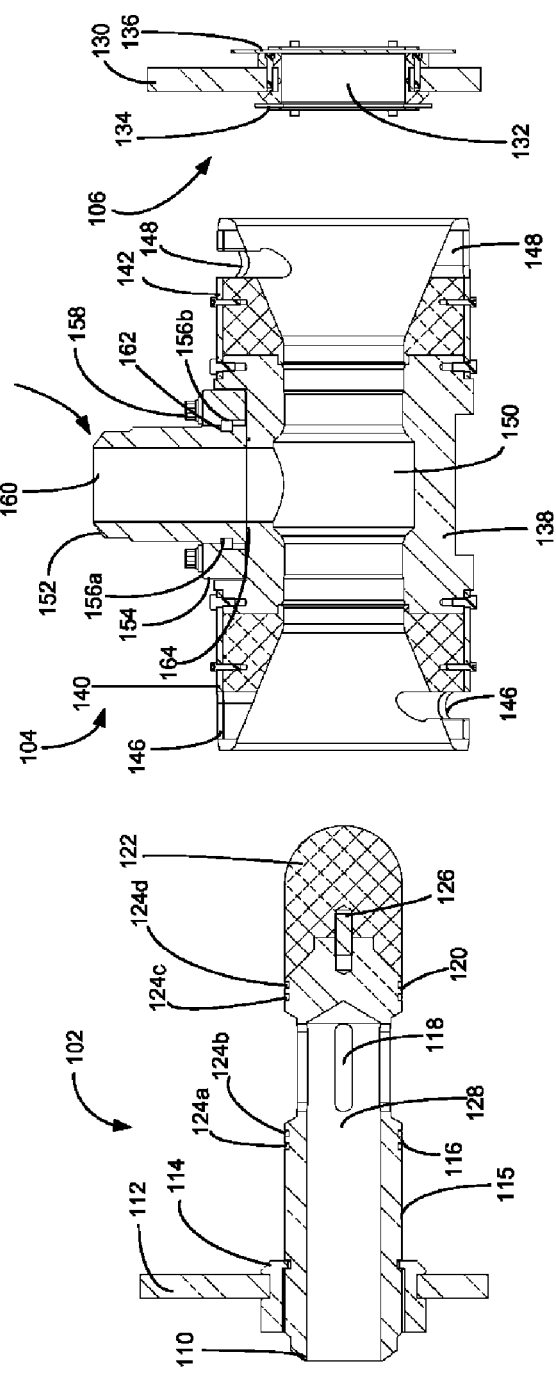

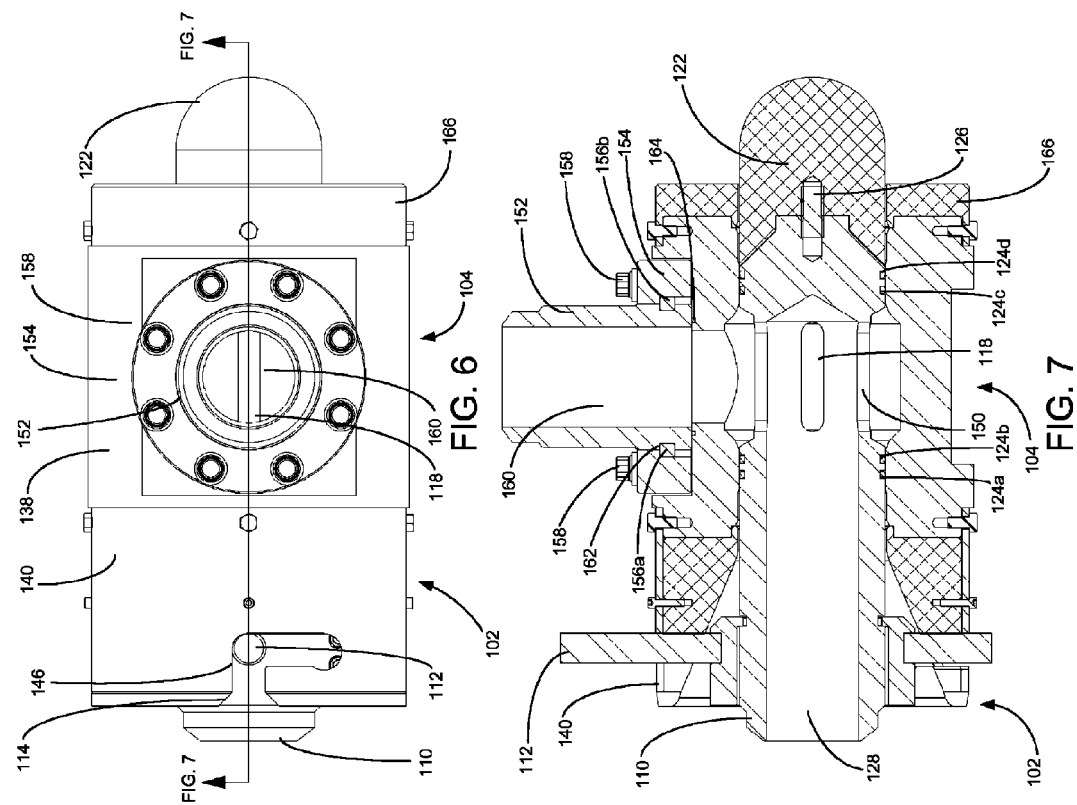

MODULAR HOT STAB WITH IMPROVED CONNECTION FLANGE

RELATED APPLICATIONS

This application claims the benefit of U.S. Provisional Patent Application No. 61/152,638, filed Feb. 13, 2009, entitled "Modular Hot Stab with Swivel Flange," the disclosure of which is herein incorporated by reference.

FIELD OF THE INVENTION

This invention relates generally to the field of connection devices, and more specifically, to a "hot stab" connector configured for use in a sub-sea environment.

BACKGROUND

Sub-sea stab connectors (or "hot stabs") are commonly used to connect underwater piping or equipment. Stab connectors are generally configured as two-component assemblies that include a female receptacle and a male insert (stab). The female receptacle is typically attached to a sub-sea structure. The corresponding stab is often connected to hoses or hydraulic lines running to surface equipment or facilities. The stab is configured for manipulation by a remote operated sub-sea vehicle (ROV) or diver. During use, the ROV or diver inserts the stab into the receptacle to connect the sub-sea equipment to the surface equipment or facilities.

Although generally acceptable, prior art hot stabs suffer from several deficiencies. The stab receptacle typically includes an outlet that is configured for connection to the sub-sea equipment or piping. The outlet is often connected to the body of the stab receptacle with a weld-o-let connection or butt-weld branch connection. The weld-o-let connection requires two difficult welds between often dissimilar metals. These difficult welds increase manufacturing costs and present a potential failure point of the welds are not properly performed. There is, therefore, a need for an improved hot stab design that facilitates manufacturing and provides a robust design. It is to this and other deficiencies in the prior art that the present invention is directed.

SUMMARY OF THE INVENTION

In a preferred embodiment, the present invention includes a connection assembly for connecting a first sub-sea line or device to a second sub-sea line or device. The connection assembly includes a stab receptacle assembly and a stab assembly. The stab receptacle assembly includes a receptacle body and an outlet assembly, which in turn, includes an adapter nipple configured for attachment to the first sub-sea line. A swivel flange secures the adapter nipple to the first side of the receptacle body. The use of the adapter nipple and swivel flange eliminates a difficult weld between the adapter nipple and the receptacle body. The connection assembly further includes a stab assembly that has a base, a line end connected to the base and a stab body connected to the base. The stab body is configured for insertion into the stab receptacle. The line end is configured for connection to the second sub-sea line.

The stab receptacle is preferably configured as a modular unit that can be configured as a single-sided receptacle or a double-sided receptacle. If configured as a double-sided receptacle, the stab receptacle is preferably fitted with two entry pieces that are configured to receive stab assemblies or debris covers installed by a remotely operated sub-sea vehicle. If configured as a single-sided receptacle, the stab receptacle is fitted with a single entry piece and an end cap.

BRIEF DESCRIPTION OF THE DRAWINGS

FIG. 2 is a top view of the assembled hot stab assembly of FIG. 1.

FIG. 3 is a side cross-sectional view of the hot stab assembly of FIG. 1.

FIG. 6 is a top view of a single-sided, modular hot stab assembly constructed in accordance with a preferred embodiment of the present invention.

FIG. 7 is a side cross-sectional view of the single-sided modular hot stab assembly of FIG. 6.

DETAILED DESCRIPTION OF PREFERRED EMBODIMENTS

Figure 1:
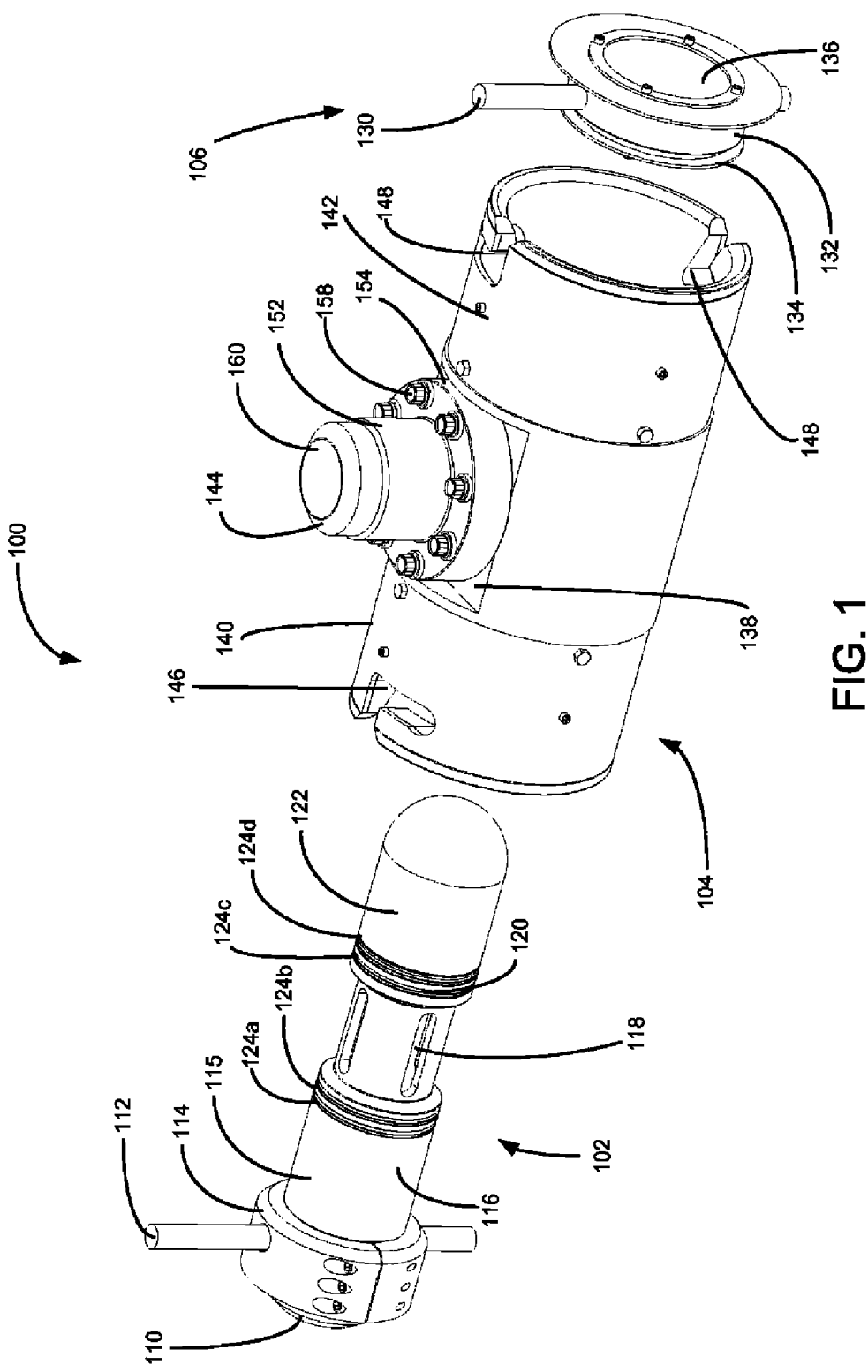
FIG. 1 is an exploded perspective view of a double-sided, modular hot stab assembly constructed in accordance with a preferred embodiment of the present invention.
Figure 4:
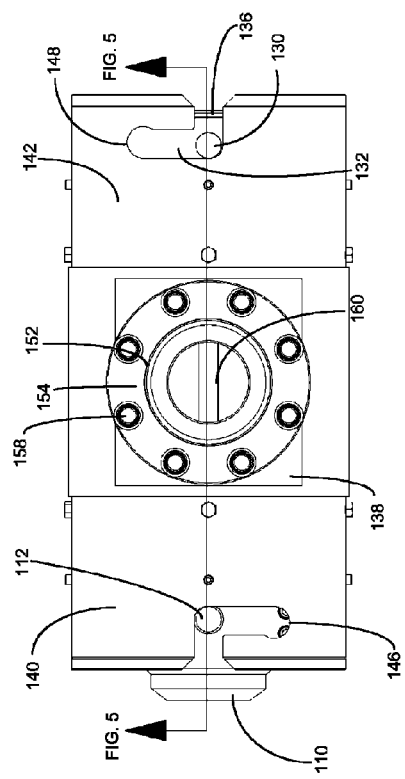
FIG. 4 is an exploded top view of the hot stab assembly of FIG. 1.

In accordance with a preferred embodiment of the present invention, FIG. 1 provides a perspective view of a double-sided, modular connection assembly 100, which is also referred to as a hot stab assembly 100. The hot stab assembly 100 includes a stab assembly 102, a stab receptacle assembly 104 and a debris cap 106. With reference also to FIGS. 2-5, it will be noted that the stab assembly 102 and debris cap 106 are both configured for removable connection with the stab receptacle assembly 104. Generally, the hot stab assembly 100 is configured to provide a quick-connect coupling between sub-sea pipes or lines in a sub-sea environment.

The stab assembly 102 preferably includes a line end 110 that is configured for connection to a hydraulic line, pneumatic line, pipe, tube or other conduit. The stab assembly 102 further includes a handle 112, a collar 114, a stab body 115, a first sealing surface 116 on the stab body 115, exit ports 118, a second sealing surface 120 on the stab body 115 and a nose piece 122. The handle 112 is connected to the collar 114 and is configured to facilitate control and manipulation of the stab assembly 102 by a remotely operated sub-sea vehicle (ROV) or diver.

Figure 5:
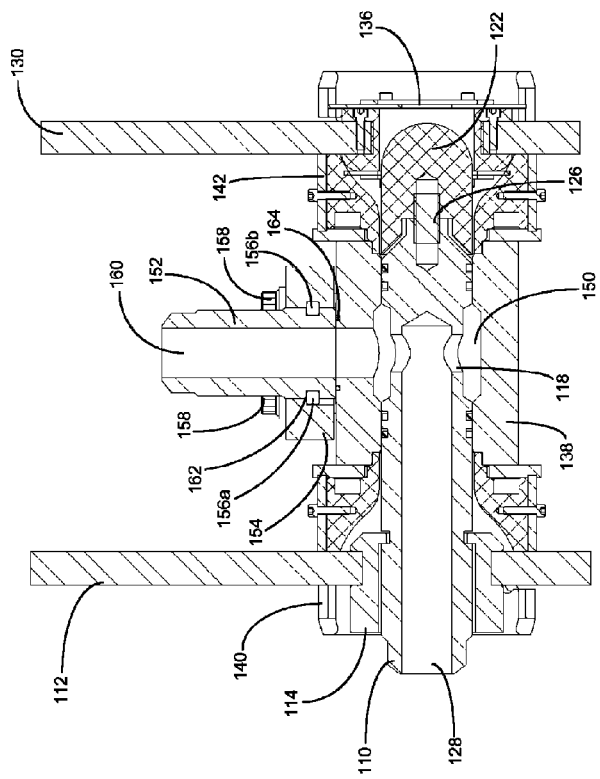
FIG. 5 is an exploded side cross-sectional view of the hot stab assembly of FIG. 1.

The stab assembly 102 preferably includes piston seals 124a, 124b, 124c and 124d disposed in grooves within the first and second sealing surfaces 116, 120. The piston seals 124a-d are preferably manufactured from an elastomer or thermoplastic. The nose piece 122 is preferably manufactured from ultra-high molecular weight polyethylene (UHMWP) and secured to the stab body 115 with an all-thread connector 126 (as shown in FIGS. 3 and 5). As best seen in FIGS. 3 and 5, the stab assembly 102 includes a central bore 128 extending from the line end 110 to the exit ports 118.

The debris cap 106 includes a handle 130, a debris cap body 132, an interior flange 134 and an exterior cap 136. The handle 130 is connected to the debris cap body 132 and is configured to facilitate control and manipulation of the debris cap 106 by a remotely operated sub-sea vehicle (ROV) or diver. The interior flange 134 preferably includes a rubber or elastomer washer with a centrally disposed aperture (not visible in FIG. 1) that is configured to accept the nose piece 122.

The exterior flange 136 is preferably configured as a solid or split rubber or elastomer membrane that prevents the admittance of debris into the interior of the hot stab assembly 100.

The stab receptacle assembly 104 includes a receptacle body 138, a first entry piece 140, a second entry piece 142 and an outlet assembly 144. The first and second entry pieces 140, 142 are preferably configured to be secured to opposite sides of the body 138 with a plurality of bolts (not shown). The first entry piece 140 includes a pair of J-latch notches 146 that are configured to accept the handle 112 of the stab assembly 102. When the handle 112 is inserted into the J-latch notches 146 and rotated, the J-latch notches 146 prevent the accidental removal of the stab assembly 102 from the stab receptacle assembly 104. Similarly, the second entry piece 142 includes a pair of J-latch notches 148 that are configured to accept the handle 130 of the debris cap 106. When the handle 130 is inserted into the J-latch notches 148 and rotated, the J-latch notches 148 prevent the accidental removal of the debris cap 106 from the stab receptacle assembly 104.

The receptacle body 138 includes a central cavity 150 that opens to the first and second entry pieces 140, 142 and the outlet assembly 144. The outlet assembly 144 preferably includes an adapter nipple 152, a swivel flange 154, a pair of half rings 156a and 156b, and mounting bolts 158. The adapter nipple 152 preferably includes a bevel for weld end 153 that is configured for connection to a sub-sea device or line. The adapter nipple 152 also includes a central passage 160 that extends into the central cavity 150. The adapter nipple 152 also includes a ring groove 162 that is configured to accept the half rings 156a, 156b.

During construction, the bevel for weld end 153 of the adapter nipple 152 is welded onto the outlet pipe or sub-sea equipment (not shown). Next, the swivel flange 154 is placed over the free end of the adapter nipple 152. Once the swivel flange 154 is loaded onto the adapter nipple 152, the pair of half rings 156a, 156b are inserted into place in the ring groove 162 to lock the swivel flange in place. Lastly, the swivel flange 154 is rotated into alignment with the mounting bores on the receptacle body 138 and the mounting bolts 158 are inserted to secure the outlet assembly 144 to the receptacle body 138. To provide a sealing connection between the outlet assembly 144 and the receptacle body 138, the stab receptacle assembly 104 includes an o-ring seal 164 positioned between the adapter nipple 152 and the receptacle body 138 as a backup to the primary metal-to-metal face seal.

The outlet assembly 144 is superior to prior art designs that make use of a weld-o-let connection between the outlet and the body of the hot stab receptacle. The elimination of the welded connection between the outlet and the body of the hot stab receptacle is particularly beneficial in applications in which the outlet and body are manufactured from different metals, which is frequently the case.

Generally, the stab receptacle assembly 104 is configured to be connected to sub-sea piping or equipment. In a preferred method of using the hot stab assembly 100, the stab receptacle assembly 104 is connected to piping or equipment destined for a sub-sea application. During installation, two debris caps 106 are connected to the first entry piece 140 and second entry piece 142 of the stab receptacle assembly 104.

After the fixed piping or equipment is installed in the sub-sea environment and it becomes necessary to attach a line to the hot stab assembly 100, the line is secured to the line end 110 of the stab assembly 102 (typically on the surface). An ROV or diver then removes one of the debris caps 106 from the hot stab assembly 100. The ROV or diver then inserts the stab assembly 102 into the uncovered end of the hot stab assembly 100. The ROV or diver rotates the stab assembly 102 using the handle 112 to lock the stab assembly 102 in place within the stab receptacle assembly 104. The connection between the stab assembly 102 and the stab receptacle assembly 104 forms a sealed connection that permits the flow of fluid from the line to the sub-sea piping or equipment. The modular nature of the hot stab assembly 100 reduces manufacturing cost, facilitates installation by providing a wider range of sub-sea connection options and enlarges the number of options for connecting to the stab receptacle assembly 104.

Turning to FIGS. 6 and 7, shown therein is an alternate, single-sided modular hot stab assembly 100. Unless otherwise noted below, the alternate hot stab assembly 100 depicted in FIGS. 6 and 7 is constructed in the same manner set forth above with references to FIGS. 1-5. In place of the second entry piece 142, however, the alternate hot stab assembly 100 depicted in FIGS. 6 and 7 includes an end cap 166 on the stab receptacle assembly 104. The end cap 166 is preferably configured with a central aperture to permit the passage of the nose piece 122. The single-sided embodiment depicted in FIGS. 6 and 7 may be preferred in applications wherein entry is only required from a single designated side. It should be noted that modular nature of the stab receptacle assembly 104 permits the customization of the hot stab assembly 100 by interchanging the end cap 166 with an entry piece 142 or other bolt-on component.

Figure 8:
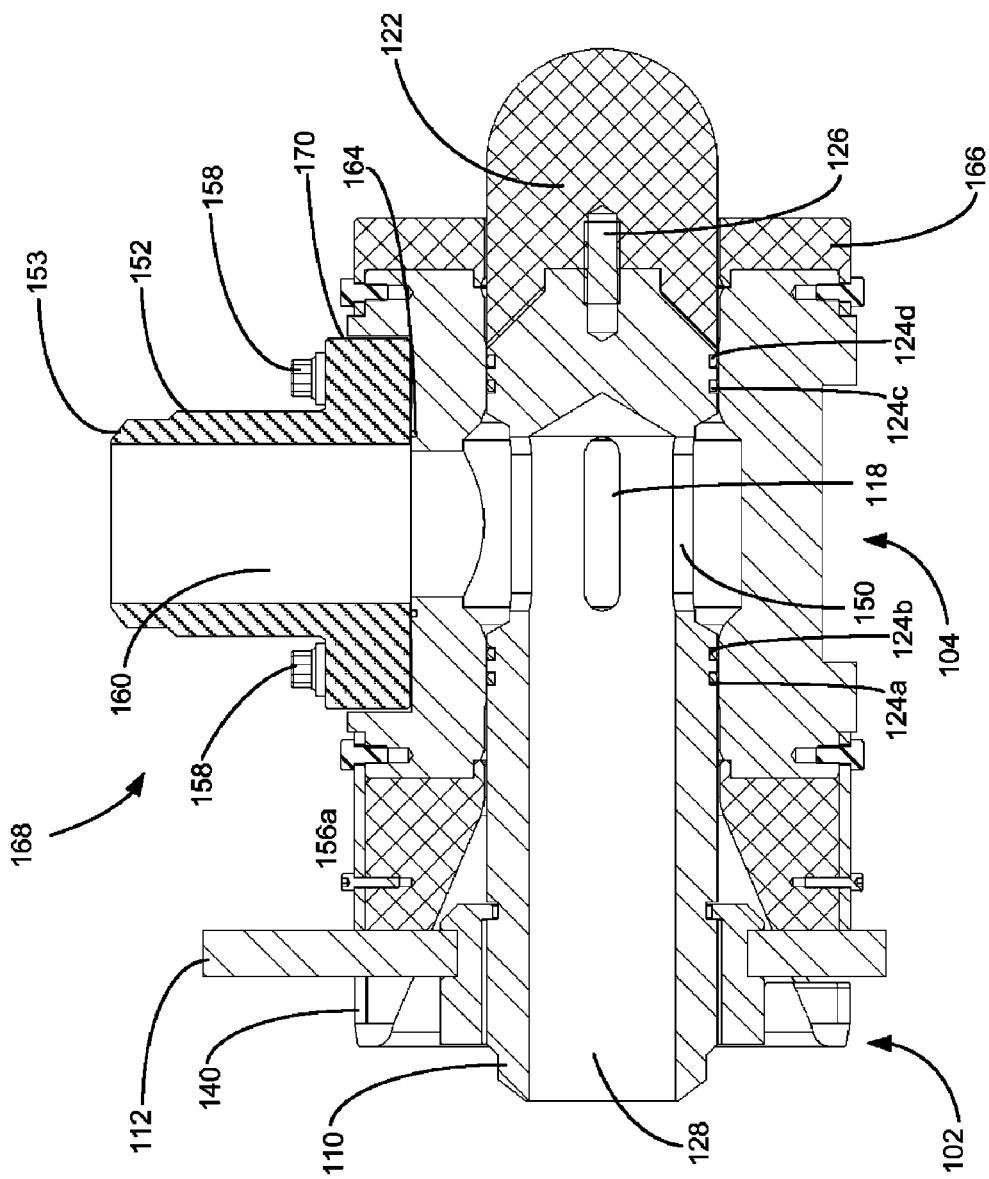
FIG. 8 is a side cross-sectional view of the single-sided modular hot stab assembly constructed in accordance with a second preferred embodiment of the present invention.

Turning to FIG. 8, shown therein is an alternate preferred embodiment of the hot stab assembly 100 that includes a fixed outlet assembly 168. In this embodiment, the swivel flange 154 is replaced with a fixed flange 170. Unlike the swivel flange 154 previously described, the fixed flange 170 does not rotated with respect to the adapter nipple 152. This eliminates the need for the half rings 156. During construction, the fixed outlet assembly 168 is placed in contact with the outlet pipe or sub-sea equipment (not shown) and rotated so that the mounting bolts 158 are aligned with the corresponding mounting bores on the receptacle body 138. Once the fixed outlet assembly 168 is properly aligned, the bevel for weld end 153 of the adapter nipple 152 is welded onto outlet pipe or sub-sea equipment. Next, the mounting bolts 158 are inserted to secure the fixed outlet assembly 168 to the receptacle body 138. To provide a sealing connection between the fixed outlet assembly 168 and the receptacle body 138, the stab receptacle assembly 104 includes an o-ring seal 164 positioned between the adapter nipple 152 and the receptacle body 138 as a backup to the primary metal-to-metal face seal.

The outlet assembly 168 is superior to prior art designs that make use of a weld-o-let connection between the outlet and the body of the hot stab receptacle. The elimination of the welded connection between the outlet and the body of the hot stab receptacle is particularly beneficial in applications in which the outlet and body are manufactured from different metals, which is frequently the case. The fixed flange 170 may be preferred over the swivel flange 154 in those applications in which the fixed flange 170 can be easily oriented with respect to the receptacle body 104 prior to attachment to the outlet pipe or sub-sea equipment.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be It is claimed:

1. A connection assembly for connecting a first sub-sea line to a second sub-sea line, the connection assembly comprising:
   a stab receptacle assembly, wherein the stab receptacle assembly includes:
      a receptacle body; and
      an outlet assembly, wherein the outlet assembly comprises:
         an adapter nipple adjacent a first side of the receptacle body, wherein the adapter nipple is configured for attachment to the first sub-sea line;
         a swivel flange that secures the adapter nipple to the first side of the receptacle body; and
         two split rings configured to secure the swivel flange onto the adapter nipple while permitting the rotation of swivel flange about the adapter nipple; and
   a stab assembly, wherein the stab assembly comprises:
      a base;
      a line end connected to the base and configured for connection to the second sub-sea line; and
      a stab body connected to the base, wherein the stab body is configured for insertion into the stab receptacle.

2. The connection assembly of claim 1, wherein the stab assembly further comprises a handle connected to the base, wherein the handle is configured for manipulation by a remotely operated sub-sea vehicle.

3. The connection assembly of claim 1, wherein the adapter nipple includes a bevel for weld end that is configured to be welded to the first sub-sea line.

4. The connection assembly of claim 1, wherein the receptacle body further includes a plurality of mounting bores and wherein the swivel flange includes a plurality of mounting bolts that can be rotated into alignment with the mounting bores on the receptacle body.

5. The connection assembly of claim 4, wherein the stab receptacle assembly further includes an o-ring seal disposed between the adapter nipple and the first side of the receptacle body.

6. The connection assembly of claim 5 further comprising a debris cap, wherein the debris cap comprises:
   a debris cap body; and
   a debris cap handle connected to the debris cap body, wherein the handle is configured for manipulation by a remotely operated sub-sea vehicle.

7. The connection assembly of claim 6, wherein the receptacle body further comprises:
   a first entry piece connected to a second side of the receptacle body, wherein the first entry piece includes a pair of notches configured to receive the handle of the stab assembly in a locking manner; and
   a second entry piece connected to a third side of the receptacle body, wherein the second entry piece includes a pair of notches configured to receive the handle of the debris cap in a locking manner.

8. The connection assembly of claim 7, wherein the a stab assembly further comprises:
   a first sealing surface on the stab body;
   a second sealing surface on the stab body; and
   a nose piece connected to the stab body.

9. The connection assembly of claim 8, wherein the stab assembly further comprises a plurality of piston seals disposed on the first and second sealing surfaces.

10. The connection assembly of claim 9, wherein the debris cap further comprises:
    an interior flange, wherein the interior flange includes an elastomer washer configured to accept the nose piece of the stab assembly; and
    an exterior flange, wherein the exterior flange includes an elastomer membrane configured to prevent the introduction of debris into the connection assembly.

11. A stab receptacle assembly for use in a sub-sea hot stab connection system, wherein the stab receptacle assembly includes:
    a receptacle body; and
    an outlet assembly, wherein the outlet assembly comprises:
       an adapter nipple adjacent a first side of the receptacle body, wherein the adapter nipple is configured for attachment to a first sub-sea line;
       a swivel flange that secures the adapter nipple to the first side of the receptacle body; and
       at least one snap ring configured to secure the swivel flange onto the adapter nipple while permitting the rotation of swivel flange about the adapter nipple.

12. The connection assembly of claim 11, wherein the adapter nipple includes a bevel for weld end that is configured to be welded to the first sub-sea line.

13. The connection assembly of claim 11, wherein the receptacle body further includes a plurality of mounting bores and wherein the swivel flange includes a plurality of mounting bolts that can be rotated into alignment with the mounting bores on the receptacle body.

14. The connection assembly of claim 13, wherein the stab receptacle assembly further includes an o-ring seal disposed between the adapter nipple and the first side of the receptacle body.

15. The connection assembly of claim 14, wherein the receptacle body further comprises:
    a first entry piece connected to a second side of the receptacle body, wherein the first entry piece is configured to receive a stab assembly or a debris cap; and
    a second entry piece connected to a third side of the receptacle body, wherein the second entry piece is configured to receive the stab assembly or the debris cap.

16. The connection assembly of claim 14, wherein the receptacle body further comprises:
    a first entry piece connected to a second side of the receptacle body, wherein the first entry piece is configured to receive a stab assembly having a nose piece; and
    an end cap connected to a third side of the receptacle body, wherein the end cap includes a central aperture configured to receive the nose piece of the stab assembly.

* * * * *